(12) United States Patent  
Yokoyama

(10) Patent No.: US 8,408,263 B2  
(45) Date of Patent: Apr. 2, 2013

(54) VACUUM LAMINATION DEVICE

(75) Inventor: Yasuhiro Yokoyama, Kanagawa (JP)

(73) Assignee: Fuji Electric Holding Co., Ltd., Tokyo (JP)

( * ) Notice: Subject to any disclaimer, the term of this patent is extended or adjusted under 35 U.S.C. 154(b) by 1363 days.

(21) Appl. No.: 11/723,026

(22) Filed: Mar. 16, 2007

(65) Prior Publication Data

US 2007/0151670 A1    Jul. 5, 2007

Related U.S. Application Data

(62) Division of application No. 10/923,882, filed on Aug. 24, 2004, now abandoned.

(30) Foreign Application Priority Data

Dec. 1, 2003    (JP) .................................. 2003-400937

(51) Int. Cl.  
    *B32B 37/10*    (2006.01)

(52) U.S. Cl. .................... 156/381; 156/382; 156/499

(58) Field of Classification Search .................. 156/286, 156/381, 382, 285, 499  
See application file for complete search history.

(56) References Cited

U.S. PATENT DOCUMENTS

| | | | | |
|---|---|---|---|---|
| 4,312,694 A * | 1/1982 | Sherman et al. | ............... | 156/286 |
| 4,398,979 A * | 8/1983 | Cathers et al. | .................. | 156/87 |
| 5,814,175 A * | 9/1998 | Rau et al. | ...................... | 156/157 |
| 5,993,582 A * | 11/1999 | Yoshino et al. | ............... | 156/104 |
| 6,007,650 A | 12/1999 | Itoyama et al. | | |
| 6,227,270 B1 * | 5/2001 | Itoyama et al. | ............... | 156/382 |
| 2002/0186533 A1 | 12/2002 | Sakaiya et al. | | |

FOREIGN PATENT DOCUMENTS

| | | |
|---|---|---|
| JP | S58-136163 | 9/1983 |
| JP | S61-109517 | 7/1986 |
| JP | H04-113926 | 10/1992 |
| JP | H09-092848 | 4/1997 |
| JP | H11-087743 | 3/1999 |
| JP | H11-145235 | 5/1999 |
| JP | 2001-337612 | 12/2001 |

* cited by examiner

*Primary Examiner* — Christopher Schatz  
(74) *Attorney, Agent, or Firm* — Manabu Kanesaka

(57) ABSTRACT

A vacuum lamination device for laminating a lamination member includes a base plate having an uneven surface contacting the lamination member for placing the lamination member, a frame member fixed to the base plate and having a discharge port for evacuating a processing space, and a cover member for hermetically sealing the processing space in the lamination process. The lamination member is placed on the uneven surface, and the cover member is placed so as to cover the lamination member. Then, a gaseous material in the processing space is evacuated through the discharge port while heating the processing space.

2 Claims, 8 Drawing Sheets

VACUUM LAMINATION DEVICE

CROSS-REFERENCE TO RELATED APPLICATION

This is a divisional application of Ser. No. 10/923,882 filed on Aug. 24, 2004 now abandoned.

BACKGROUND OF THE INVENTION AND RELATED ART STATEMENT

The present invention relates to a vacuum lamination device for performing a lamination process by evacuating a processing space in which a member to be laminated (hereinafter referred to as lamination member) such as a solar cell module and the like is arranged.

A large amount of fossil fuel has been consumed since Industrial Revolution, and the global environment has been worsened due to air pollution and global warming by $CO_2$. Accordingly, in recent years, environmental consciousness has been increased in the global scale. In this circumstance, solar cells have been expected to be as safe, easy to handle, and clean energy source. There are several types of solar cells including a single crystal silicon solar cell, a polycrystalline silicon solar cell, an amorphous silicon solar cell, and a compound semiconductor solar cell. Among these types of solar cells, the amorphous silicon solar cell can be a flexible and large area solar cell with relatively low cost, thereby increasing applications. In general, the solar cell module is exposed to open air. Accordingly, it is necessary to improve durability against temperature, humidity and external pressure for a reliable device. One of manufacturing techniques to meet the requirement is a vacuum lamination process.

FIGS. 7(A) and 7(B) are schematic views of a conventional vacuum lamination apparatus, in which FIG. 7(A) is a perspective view thereof, and FIG. 7(B) is a sectional view taken along line 7(B)-7(B) in FIG. 7(A). The conventional vacuum lamination apparatus comprises a base plate 1001, and tube 1003 arranged on the base plate in a ring shape and having evacuation holes (evacuation ports) 1002 in an inside wall thereof. The tube 1003 is fixed onto the base plate 1001 with a fixing material 1004. A cover sheet 1005 entirely covering the tube 1003 with the ring shape forms a processing space 1006 for the lamination process. A vacuum pump 1008 is provided for evacuating the processing space 1006.

In the vacuum lamination process, first, a solar cell module component 1007 with a sheet shape is placed in the vacuum lamination apparatus. Then, the vacuum pump 1008 exhausts air between materials in a degassing process. The materials are heated up to a temperature at which a sealant material contained in the solar cell module component can be cross-linked or cured, and held at the temperature for a predetermined time until the sealant material is fully cured. After that, the materials are cooled down and the vacuum pump is stopped, thereby returning to the atmospheric pressure.

FIG. 8 is a schematic view of a solar cell module manufactured by the vacuum lamination apparatus. A thermo-adhesive sealant material 1011 and a top surface covering member (surface protection film) 1012 are sequentially formed on a front surface of a photovoltaic element 1010. A thermo-adhesive sealant material 1013 and a rear surface reinforcing member 1014 are sequentially formed on a rear surface of the photovoltaic element 1010.

In the conventional vacuum lamination apparatus shown in FIGS. 7(A) and 7(B), it is difficult to secure air path between the solar cell module component 1007 and the cover sheet 1005, and between the solar cell module component 1007 and the base plate 1001. Particularly, when a large solar cell module such as the amorphous silicon solar cell is produced, due to the insufficient evacuation, it is difficult to eliminate bubbles between the laminated members constituting the solar cell module.

To solve this problem, for example, Japanese Patent Publication (Kokai) No. 11-87743 has disclosed a technique in which an evacuation layer is provided between the base plate and the material constituting the solar cell module, thereby obtaining sufficient evacuation. FIG. 9 is a schematic cross-sectional view showing a conventional vacuum lamination device in which the evacuation layer is arranged between the base plate and the material constituting the solar cell module.

The solar cell module 1020 is placed on a plate-like base plate 1021 with a first evacuation layer member (for example, stainless steel mesh) 1023 covered with a sealing material flow-out prevention member 1022 and a second evacuation layer member (for example, polyester fiber non-woven fabric) 1024 in between. The second evacuation layer member 1024 is placed to cover an upper surface of the solar cell module 1020. A cover member 1025 is placed on the second evacuation layer member 1024 such that the cover member 1025 covers a tubular member arranged in a ring shape shown in FIG. 7(A). Then, the evacuation is performed.

In the conventional vacuum lamination device described above, it is necessary to provide, for example, the two evacuation layer members and the sealing material flow-out prevention member below the lamination member. Accordingly, the layer structure becomes complicated and cost of the vacuum lamination device increases. Particularly, in the lamination process of a large-sized solar cell module, the lamination member also becomes large, thereby making it difficult to handle the vacuum lamination device and increasing assembling cost.

Further, as mentioned previously, in the vacuum lamination process, the vacuum lamination device is heated from outside in a state that the laminated members are arranged in the vacuum lamination device and the vacuum lamination device is evacuated. In order to heat the lamination members, heat conduction through the base plate formed of metal becomes important. In the conventional vacuum lamination device, the evacuation layer members and the sealing material flow-out prevention member have poor thermal conductivity, thereby lowering heating efficiency.

In view of the drawbacks described above, the present invention has been made, and an object of the present invention is to provide a vacuum lamination device for manufacturing a solar cell module having improved heating efficiency with low cost.

Further objects and advantages of the invention will be apparent from the following description of the invention.

SUMMARY OF THE INVENTION

To attain the objects described above, according to the present invention, a vacuum lamination device performs a lamination process by evacuating a processing space in which a lamination member is arranged. The vacuum lamination device includes a base plate for placing the lamination member having an uneven portion on a surface thereof contacting the lamination member; a frame member fixed to the base plate and having a discharge port for evacuating the processing space; and a cover member for hermetically sealing the processing space in the lamination process.

With the structure described above, the processing space is hermetically sealed by the cover member. Air in the processing space is evacuated through the discharge port formed in the frame member. The uneven portion of the base plate forms an evacuation layer upon degassing the lamination member, thereby facilitating the evacuation of the lamination member.

In the present invention, the uneven portion is formed on the surface of the base plate contacting the lamination member. Accordingly, it is possible to ensure the evacuation layer between the lamination member and the base plate without providing a specific evacuation layer member, thereby degassing the lamination member with the simple structure and reducing manufacturing cost of the vacuum lamination device. Further, it is possible to eliminate an evacuation layer member having low thermal conductivity between the base plate and the lamination member, thereby improving the heating efficiency.

The lamination member may be a solar cell module and placed on the base plate such that a light reception surface thereof contacts the uneven portion. In such a case, an uneven surface is formed on the light reception surface of the solar cell module, thereby preventing regular reflection and obtaining an excellent appearance. Further, another uneven portion may be formed on a surface of the base plate opposite to the surface thereof contacting the lamination member. Accordingly, it is possible to increase a surface area, thereby improving the heating efficiency. At the same time, it is possible to increase a frictional force so that the vacuum lamination device does not slip when being transferred with rollers and the like.

BRIEF DESCRIPTION OF THE DRAWINGS

FIGS. 7(A) and 7(B) are views of a conventional vacuum lamination device, wherein FIG. 7(A) is a perspective view thereof and FIG. 7(B) is a cross-sectional view taken along line 7(B)-7(B) in FIG. 7(A);

DETAILED DESCRIPTION OF PREFERRED EMBODIMENTS

Figure 1:
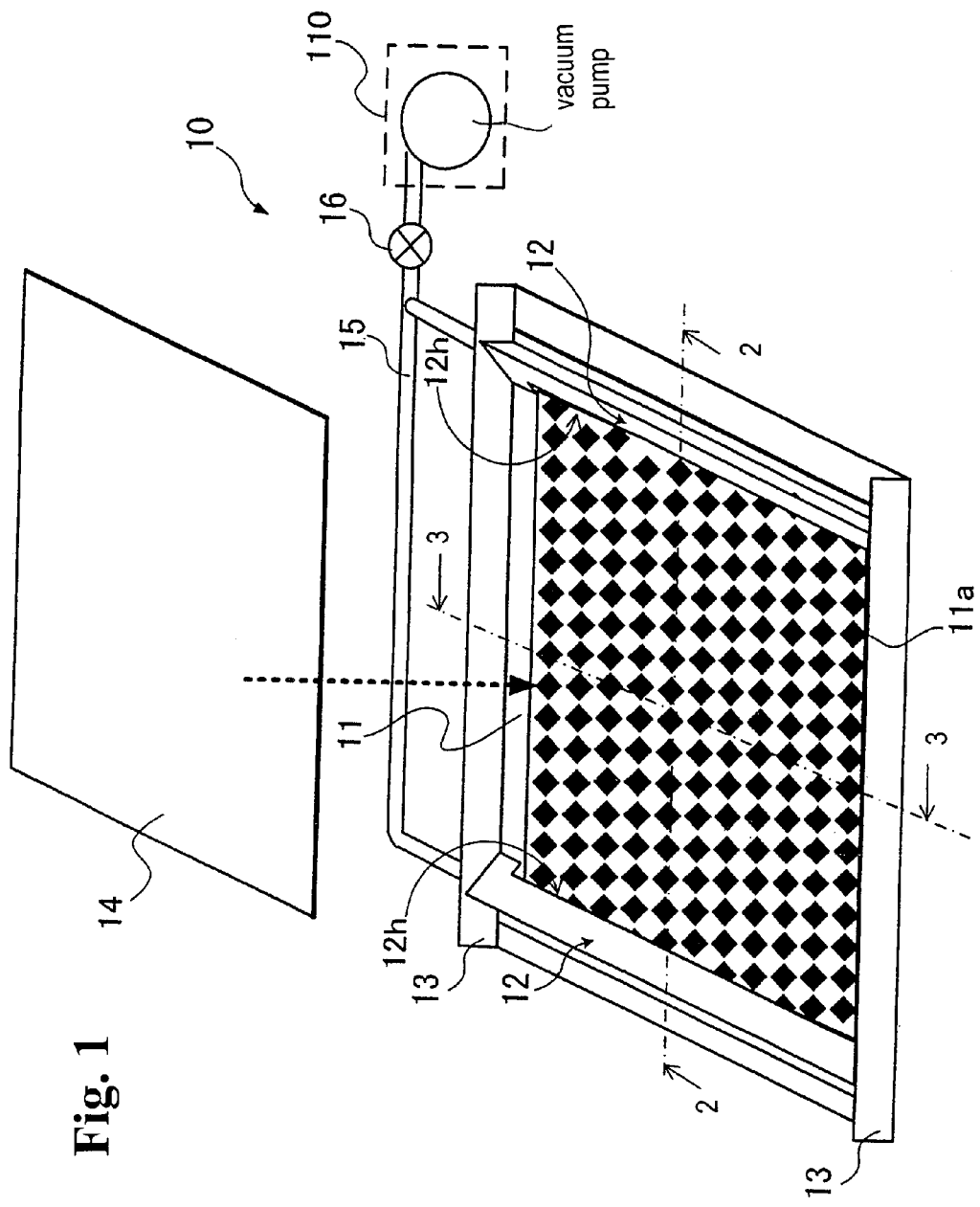
FIG. 1 is a perspective view of a vacuum lamination device according to an embodiment of the present invention.
Figure 2:
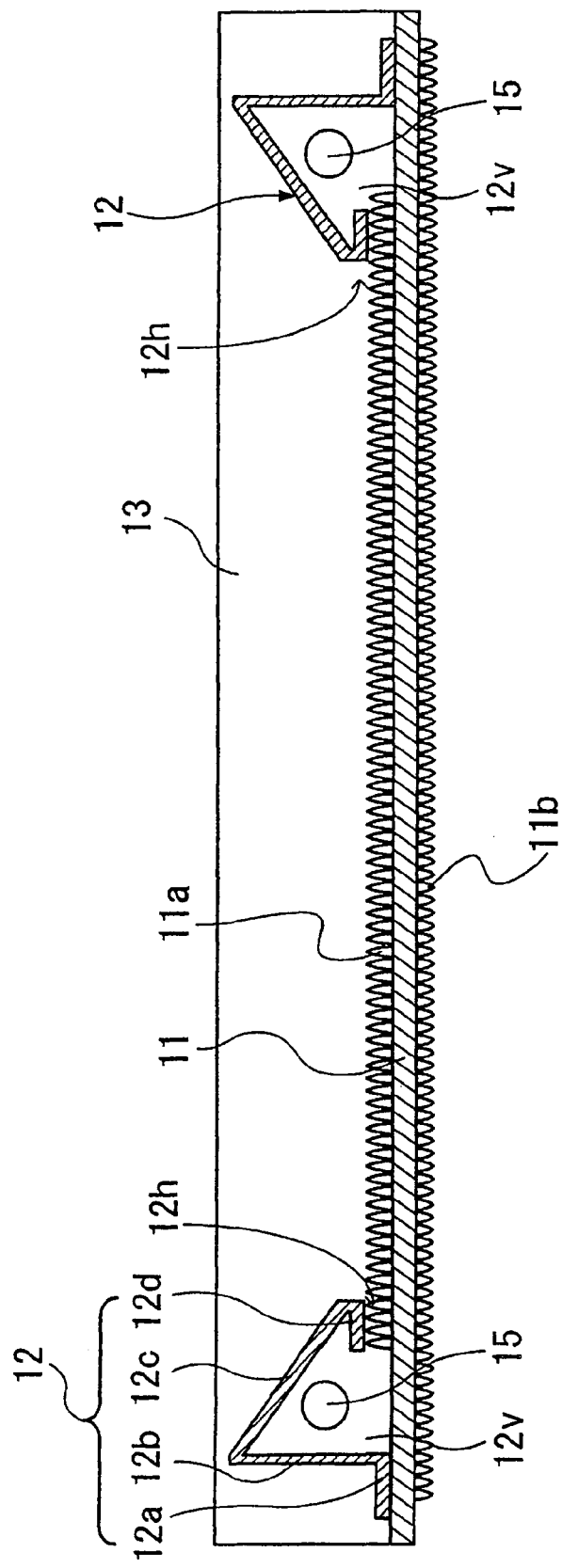
FIG. 2 is a cross-sectional view taken along line 2-2 in FIG. 1.
Figure 3:
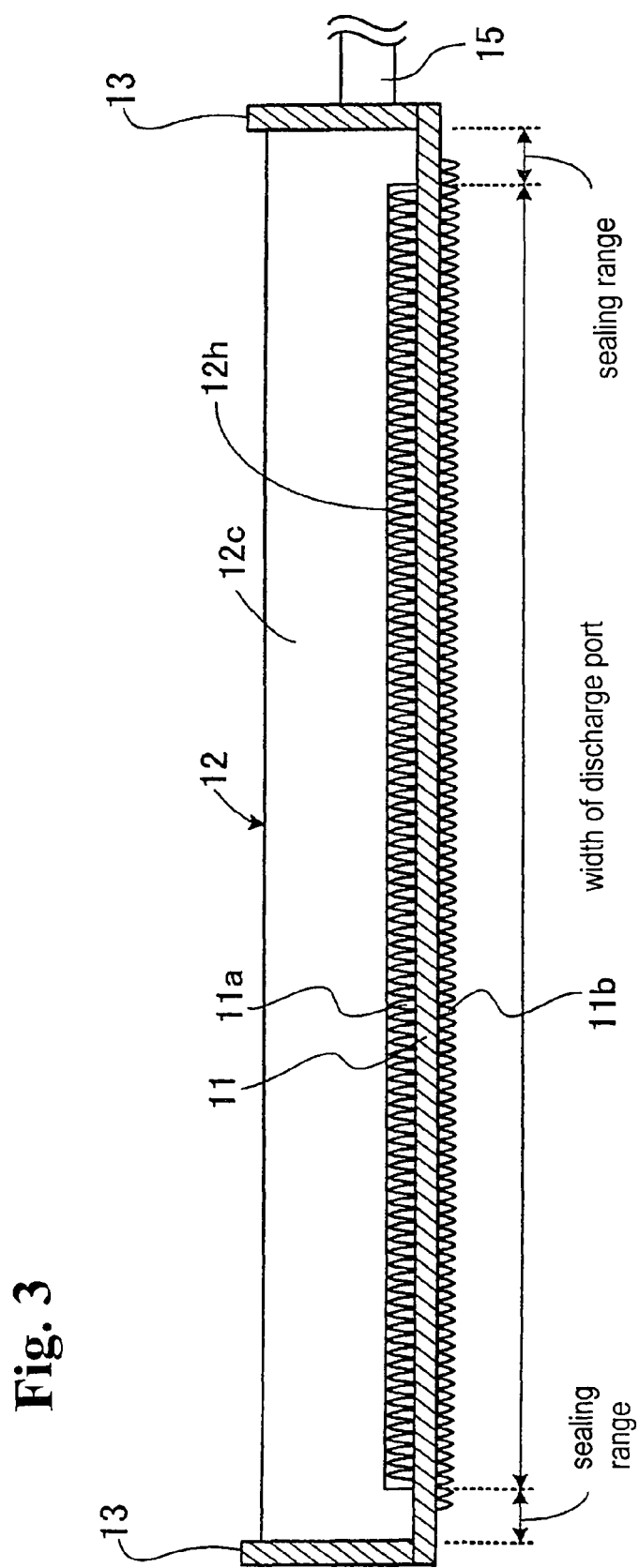
FIG. 3 is a cross-sectional view taken along line 3-3 in FIG. 1.

Hereunder, embodiments of the present invention will be explained in detail with reference to the accompanying drawings. FIG. 1 is a perspective view of a vacuum lamination device according to an embodiment of the present invention. FIG. 2 is a cross-sectional view taken along line 2-2 in FIG. 1. FIG. 3 is a cross-sectional view taken along line 3-3 in FIG. 1. According to an embodiment, a vacuum lamination device 10 includes a base plate 11 for placing a lamination member (referred to as a solar cell module) thereon; frame members 12 fixed on the base plate 11 and having discharge ports 12h for evacuating a processing space; plate members 13 fixed to end portions of the frame members 12 in a width direction; and a cover member 14 for hermetically sealing the processing space. The vacuum lamination device 10 further includes a discharge port 15 as a path for connecting the frame members 12 and a vacuum pump 110 through a valve 16.

The base plate 11 constitutes a bottom portion of the vacuum lamination device 10. The base plate 11 is provided with an uneven portion 11a on a surface thereof contacting the solar cell module (not shown) and an uneven portion 11b on an opposite surface thereof (see FIG. 2 and FIG. 3). The uneven portion 11a functions as an evacuation layer upon degassing and forms an uneven surface on the solar cell module. The uneven portion 11a preferably has a pitch of 0.3 to 0.8 mm and a height within a range of 0.2 to 0.6 mm. Further, it is preferable that the uneven portion 11a has an outer periphery positioned outside an outer periphery of the solar cell module on the base plate 11.

The uneven portion 11b is formed on the opposite surface of the base plate. The uneven portion 11b increases a surface area for efficiently absorbing heat from ambient hot air upon heating, and also increases a frictional force to prevent slipping when the vacuum lamination device 10 is transferred with rollers. It is preferable that the uneven portion 11b has a pitch of 0.2 to 0.5 mm and a height within a range of 0.2 to 0.4 mm.

In the vacuum lamination device 10 for manufacturing the solar cell module, the base plate 11 needs to have heat resistance, rigidity and lightweight. A material of the base plate 11 may be mainly metal such as iron, aluminum and the like, and stainless steel is preferably used in view of formability, weldability and corrosion resistance. It is preferred to reduce a thickness of the base plate 11 to decrease a heat capacity and weight. However, when the base plate 11 has an excessively small thickness, the rigidity is decreased. Accordingly, it is preferable that the base plate 11 has a thickness within a range of, for example, 0.8 to 2.0 mm.

The frame members 12 are fixed at two opposing sides of the base plate 11, and the plate members 13 are fixed to the ends portions of the frame members 12 in the width direction. In this embodiment, the frame members 12 have a cross-section shown in FIG. 2, and is formed of a first bent surface 12a, a second bent surface 12b, a third bent surface 12c and a fourth bent surface 12d. The first bent surface 12a and the second bent surface 12b are substantially bent at a right angle. An outer peripheral side of the base plate 11 abuts against and is welded to the first bent surface 12a with electric spot welding at an interval of approximately 100 mm. The third bent surface 12c is bent at an acute angle of approximately 30° with respect to the base plate 11. The fourth bent surface 12d is bent such that a bent portion formed between the third bent surface 12c and the fourth bent surface 12d defines a gap with respect to the base plate 11. The gap constitutes the discharge port 12h, and it is desirable that the discharge port 12h has a height substantially equal to the height of the uneven portion 11a on the base plate 11, thereby ensuring the discharge efficiency.

As shown in FIG. 3, the fourth bent surface 12d is bent from the third bent surface 12c to form sealing ranges at both sides of the gap in the width direction, so that air is not discharged and the cover member 14 closely contacts the base plate 11 (described later). The sealing range may have a length of, for example, 10 mm.

Discharge spaces 12v are formed inside the frame members 12 with the base plate 11 for discharging air in the processing space through the discharge ports 12h. The discharge port 15 is inserted into the exhaust spaces 12v through one of the plate members 13 and is connected with the vacuum pump 110. In the lamination process, the vacuum pump 110 discharges air in the processing space hermetically sealed by the cover member 14 through the discharge ports 12h, the exhaust spaces 12v, and the discharge port 15.

It is preferable that the plate members 13 extend between the frame members 12 at the opposing sides to increase rigidity of the vacuum lamination device 10. The base plate 11 may include bent portions as the plate members, thereby reducing the number of manufacturing steps. When a large solar cell module is manufactured as a roof member, it is necessary to provide a long processing space with a rectangular shape. In view of the exhaust efficiency, it is desirable that the frame members 12 are arranged at long sides of the rectangular shape for forming the processing space. Similar to the base plate 11, the frame members 12 are required to have heat resistance, rigidity and lightweight, and stainless steel is used as a material of the frame members, for example.

The plate members 13 are fixed to the frame members 12 and the base plate 11 with spot welded using TIG welding (Tungsten Inert Gas welding), for example. All welded portions are sealed by a silicon sealant KE45 (trademark of Shinetsu Silicone Ltd.), for example, to prevent leaking during the evacuation process. It is preferable that the joint portions of the frame members 12 and the base plates 11 are degreased before sealing.

When the processing space is hermetically sealed and the processing space is evacuated through the exhaust spaces 12v, the cover member 14 pushes the solar cell module arranged in the processing space against the base plate 11 to promote the degassing of the solar cell module. Accordingly, the cover member 14 needs to have heat resistance, flexibility, lightweight, hermetic property during the evacuation process and the like. Silicon such as a silicon rubber (thickness; 2 t, hardness; 50, all-purpose type silicon resin, a product of Tigers Polymer Ltd.) is used as a material of the cover member 14.

Figure 4:
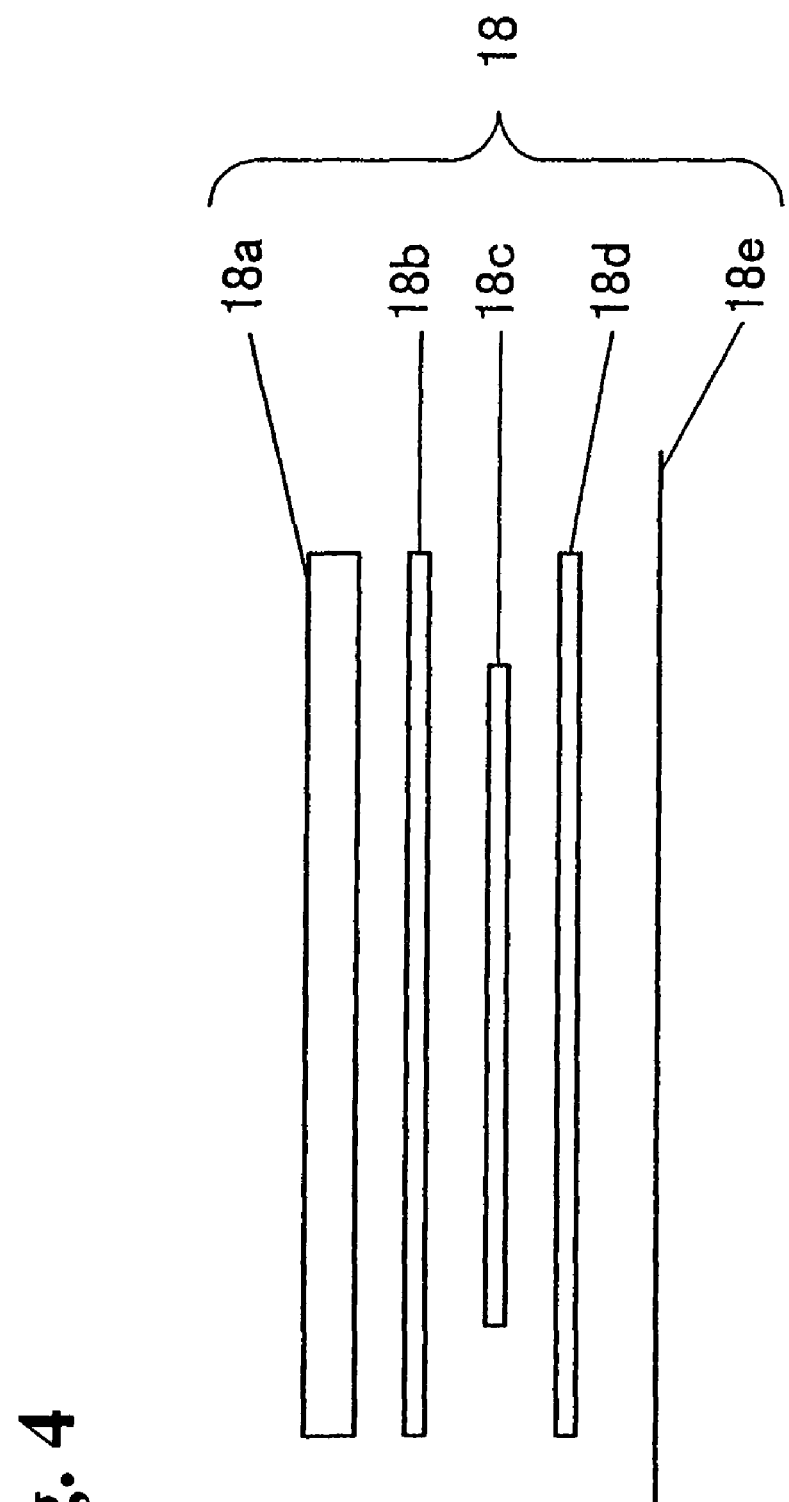
FIG. 4 is a schematic view showing a solar cell module to be laminated by the vacuum lamination device according to the embodiment.

FIG. 4 is a schematic view of the solar cell module to be laminated using the vacuum lamination device of the embodiment. A solar cell module 18 has a laminated structure, in which a back surface reinforcing member 18a, a thermo-adhesive sealing member 18b, a photovoltaic element 18c, a thermo-adhesive sealing member 18d and a surface coating member 18e are arranged in this order from the top. In this embodiment, the lamination process is performed while a light reception surface of the photovoltaic element 18c is placed on the base plate 11 (face down). The surface coating member 18e has a size larger than those of other members, so that the thermo-adhesive sealing members 18b and 18d flowing out from the solar cell module 18 in the lamination process are prevented from sticking to the base plate 11. In the solar cell module, light is incident from outside on the surface coating member 18e, i.e. a transparent resin film forming an uppermost surface, and reaches the photovoltaic element 18c, so that a voltage is generated and taken out through an output terminal (not shown).

Figure 5:
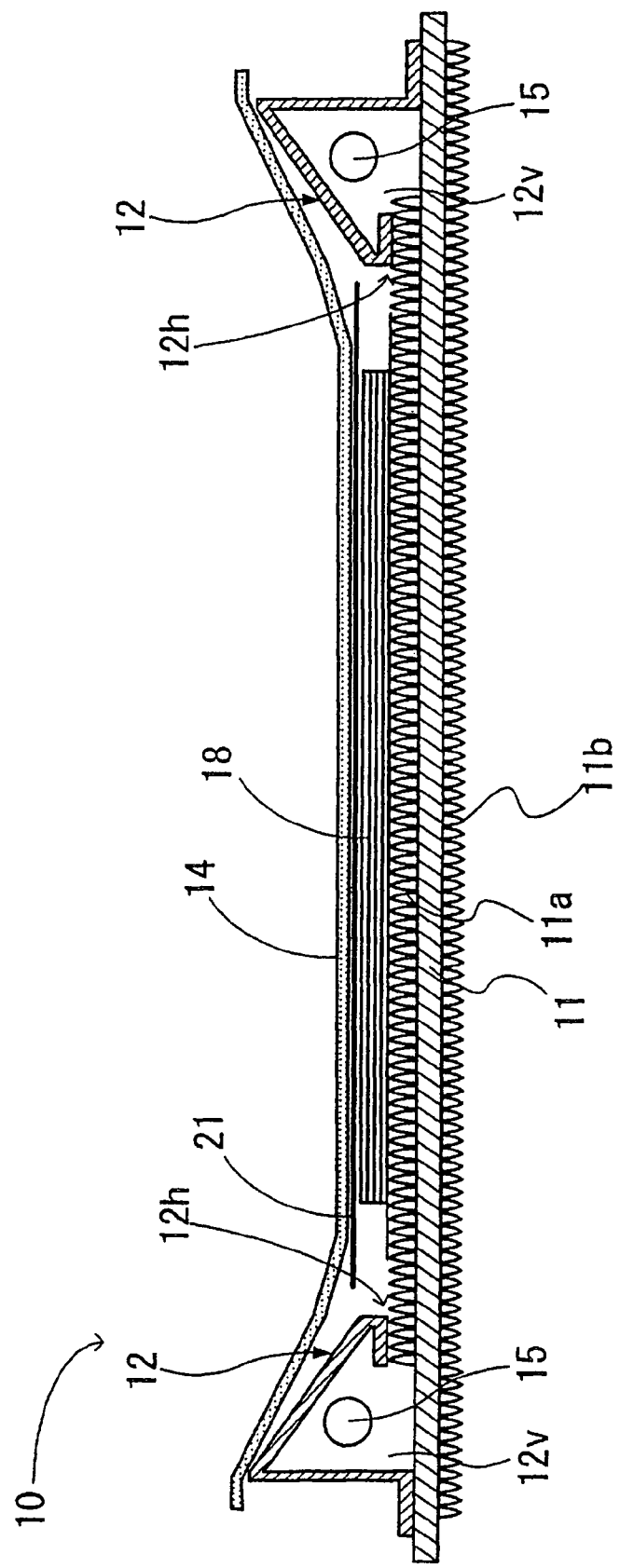
FIG. 5 is a view showing the vacuum lamination device in a lamination process.

FIG. 5 is a view showing the vacuum lamination device in the lamination process. FIG. 5 corresponds to FIG. 2, a cross-sectional view of the vacuum lamination device 10 taken along line 2-2 in FIG. 1. FIG. 5 shows a state in which the solar cell module 18 shown in FIG. 4 is placed on the base plate 11 in a face down manner, and the cover member 14 covers the frame members 12 and hermetically seals the processing space.

In the lamination process, as shown in the drawing, the solar cell module 18 is arranged on the uneven portion 11a of the base plate 11, and a peel-off sheet member 21 is arranged on the solar cell module 18 in the processing space to prevent the thermo-adhesive sealing members 18b and 18d flowing out from the solar cell module 18 from sticking to the cover member 14. In the face down state, the peel-off sheet member 21 contacts the back surface reinforcing member 18a of the solar cell module 18 in a face-to-face manner. Since the back surface reinforcing member 18a is formed of a material having no permeability such as a steel plate, it is unnecessary to use a permeable member as the peel-off sheet member 21.

The cover member 14 overlaps on the sealing ranges shown in FIG. 3 by a specific length (for example, 2 mm or greater) and covers the frame members 12. After the respective members are arranged, the vacuum pump 110 starts the evacuation of air in the processing space. The cover member 14 pushes the solar cell module 18 against the base plate 11 for promoting the evacuation of air in the solar cell module 18. The uneven portion 11a formed on the base plate 11 serves as the evacuation layer, thereby facilitating the evacuation. In the state that the vacuum pump 110 evacuates air in the processing space, a temperature is elevated to a point (for example, 150° C.) at which the thermo-adhesive sealing members 18b and 18c of the solar cell module 18 are cured, and is held until the curing is finished (for example, 30 minutes). Thereafter, the valve 16 is closed and the vacuum lamination device 10 is cooled while the vacuum state of the vacuum lamination device 10 is maintained. Then, the valve 16 is opened to return the processing space to the atmospheric pressure. The solar cell module is formed through the steps described above. The solar cell module has the light reception surface having the uneven surface, so that it is possible to prevent the regular reflection and obtain an excellent appearance.

Figure 6:
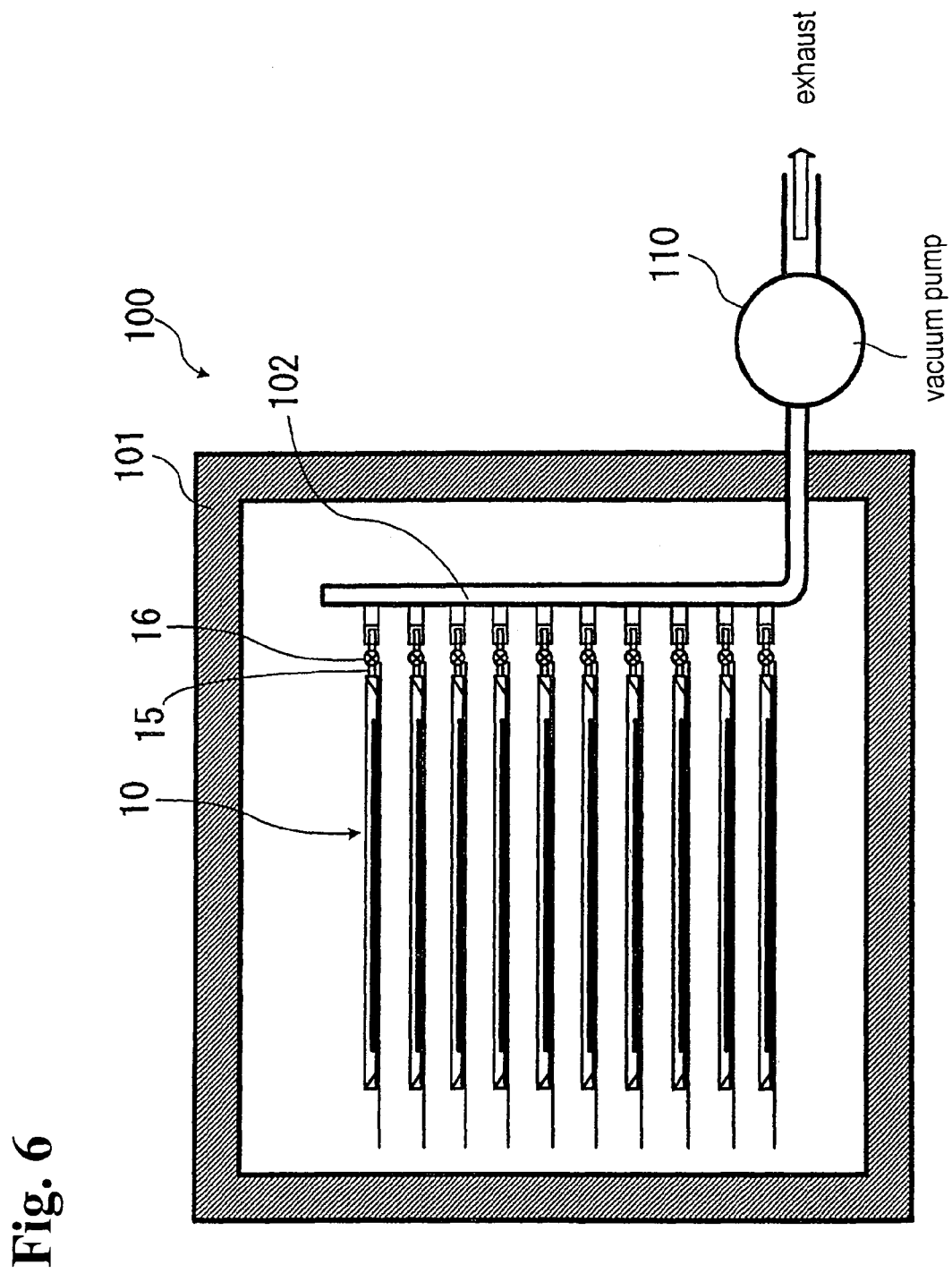
FIG. 6 is a schematic view showing a solar cell module manufacturing system having the vacuum lamination devices.
Figure 7A:
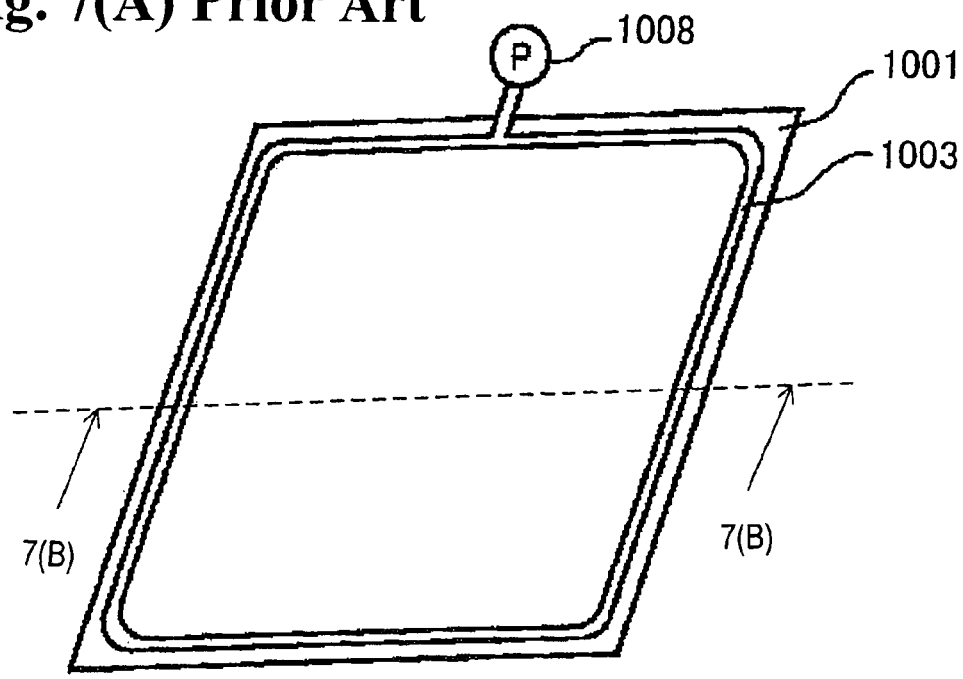
Figure 7B:
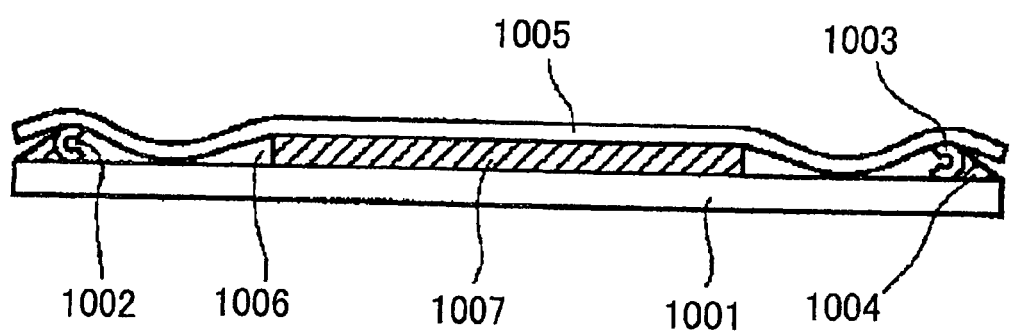
Figure 8:
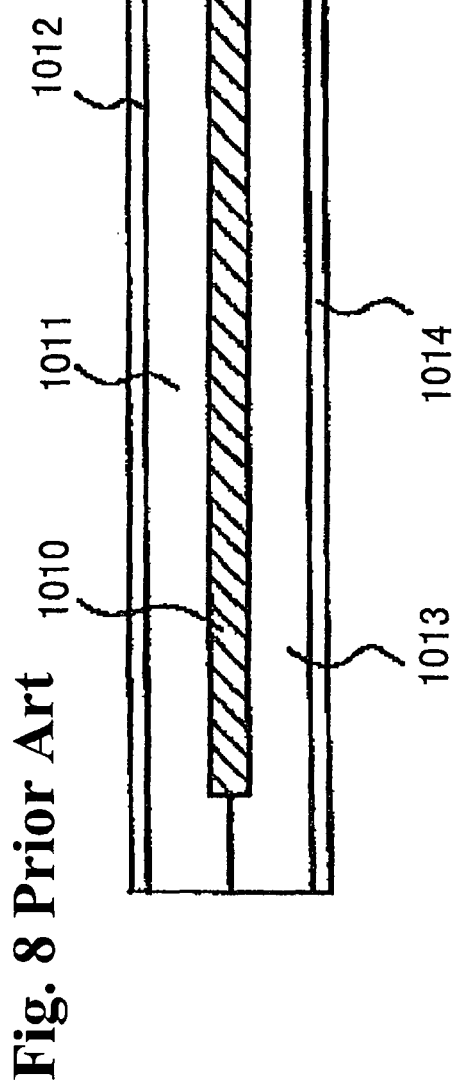
FIG. 8 is a schematic view of a solar cell module produced by a vacuum lamination device.
Figure 9:
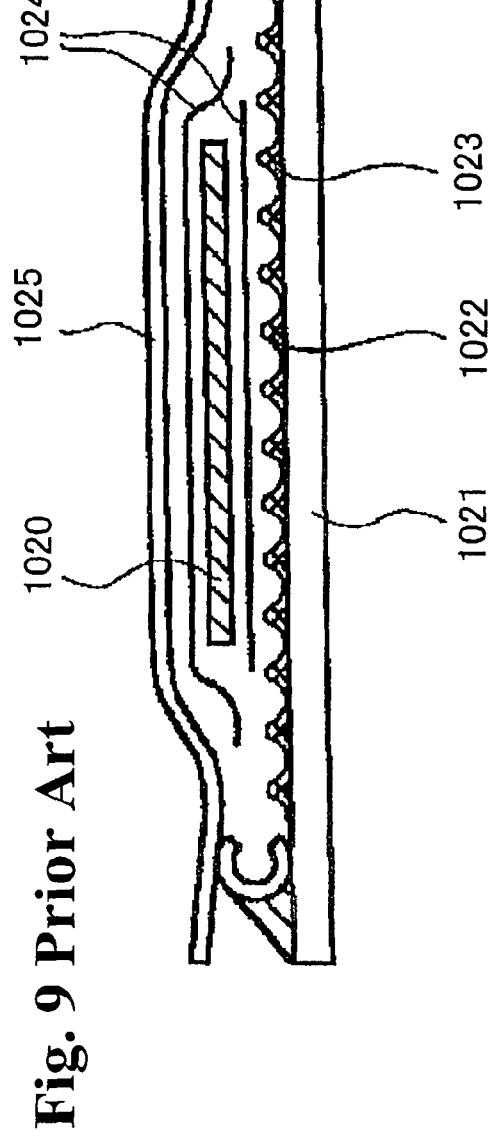
FIG. 9 is a schematic cross-sectional view of a conventional vacuum lamination device having an evacuation layer between a base plate and a solar cell module.

A solar cell module manufacturing system including the vacuum lamination devices 10 of the embodiment will be explained next. FIG. 6 is a schematic view of the solar cell module manufacturing system including the vacuum lamination devices. FIG. 6 is a cross-sectional view showing the vacuum lamination devices 10 arranged in a solar cell module manufacturing system 100, and the solar cell module is arranged in the processing space as shown in FIG. 5.

The solar cell module manufacturing system 100 includes a hot-air circulation type heating furnace 101, in which the vacuum lamination devices 10 are arranged. As shown in FIG. 6, in this embodiment, the solar cell module manufacturing system 100 is able to manufacture ten solar cell modules at the same time. Each of the vacuum lamination devices 10 is connected to an exhaust manifold 102 disposed inside the heating furnace 101 through the valve 16 mounted on the discharge port 15.

In the lamination process, the vacuum pump 110 is started to evacuate air in the processing spaces of the vacuum lamination devices 10, and the heating furnace 102 is turned on for heating. As explained above, in the vacuum lamination device 10 according to the embodiment, the surface of the base plate 11 contacting the lamination member 11 is formed in the uneven shape. Accordingly, it is possible to secure the evacuation layer without a specific evacuation layer member, thereby improving the evacuation efficiency. Further, the uneven portion is formed also on the surface of the base plate 11 opposite to the surface contacting the lamination member. Therefore, the heat transfer area is increased, and the heating efficiency is improved. Also, it is possible to reliably transfer the vacuum lamination device 10 with rollers.

In the embodiments described above, the frame members are provided at the opposing sides for performing the lamination process. Alternatively, the frame members may be fixed to the base plate 11 in an annular shape. The solar cell module 18 is arranged in the face down manner in the lamination process. It is also possible to perform the lamination process while the solar cell module 18 is arranged in a face up manner. In this case, it is preferable to use a permeable member as the peel-off sheet member 21. In the embodiments, the solar cell module 18 is the lamination member, and the lamination member is not limited thereto. The present invention is also applicable to a semiconductor device requiring such a lamination process. That is, the present invention is applicable to a solar cell module, a semiconductor device and the like which requires a lamination process.

The disclosure of Japanese Patent Application No. 2003-400937, filed on Dec. 1, 2003, is incorporated in the application.

While the invention has been explained with respect to the specific embodiments of the invention, the explanation is illustrative and the invention is limited only by the appended claims.

What is claimed is:

1. A vacuum lamination device for laminating a lamination member, comprising:
    a base plate for placing the lamination member having a first uneven portion on a surface thereof contacting the lamination member,
    two opposing frame members fixed to the base plate and each having a discharge port, and
    a cover member disposed above the base plate and the frame members for forming a processing space together therewith and hermetically sealing the processing space, a gaseous material in the processing space being evacuated through the discharge port in a lamination process,
    wherein the base plate further includes even portions on the surface thereof at two sides of the first uneven portion perpendicular to the two opposing frame members such that the cover member closely contacts the even portions during the lamination process, and
    wherein each of the frame members includes an elongated gap forming the discharge port and having a height such that the first uneven portion is disposed in the elongated gap.

2. A vacuum lamination device according to claim 1, wherein each of the frame members includes a first portion fixed to the base plate, a second portion extending upwardly from the first portion, a third portion bent at an acute angle relative to the second portion, and a fourth portion bent from the third portion toward the second portion to form said elongated gap.

* * * * *